United States Patent [19]

Kochem

[11] 4,071,871
[45] Jan. 31, 1978

[54] MOTOR PROTECTOR CIRCUIT

[75] Inventor: Robert C. Kochem, Attleboro, Mass.

[73] Assignee: Texas Instruments Incorporated, Dallas, Tex.

[21] Appl. No.: 644,794

[22] Filed: Dec. 29, 1975

[51] Int. Cl.² ............................................. H02H 7/08
[52] U.S. Cl. .................................... 361/27; 361/113; 361/106
[58] Field of Search ............... 317/53, 40 R, 41, 18 C, 317/27 R, 13 B, 13 C, 13 R, 41, 132, 138, 147; 323/48, 57, 62, 76; 340/417, 419, 228 R, 253 D; 318/473, 474

[56] References Cited

U.S. PATENT DOCUMENTS

| | | | |
|---|---|---|---|
| 2,394,786 | 2/1946 | Korneke, Jr. | 317/53 X |
| 2,441,967 | 5/1948 | Haug | 323/76 X |
| 2,991,397 | 7/1961 | Place | 317/53 X |
| 3,358,208 | 12/1967 | Takami | 317/40 R X |
| 3,728,582 | 4/1973 | Agnew | 317/18 C |

*Primary Examiner*—J D Miller
*Assistant Examiner*—Patrick R. Salce
*Attorney, Agent, or Firm*—John A. Haug; James P. McAndrews

[57] ABSTRACT

A circuit useful to protect motors and other dynamo-electric machines from overtemperature conditions caused by a fault condition such as locked rotor, overcurrent, or the like. The circuit comprises first and second tuned branch circuits coupled to the power lines of the motor or other machine along with an oscillator circuit and detector circuit and a switch to change the effective impedance of one of the tuned circuits. The tuned circuits each includes a series connected inductance and capacitance while the switch, which can be an electro-mechanical device such as a heat responsive thermostatic switch, or a solid state switch such as an NTC or PTC thermistor is connected around one of the components of one of the tuned circuits. The oscillator may be a conventional one adapted to provide a selected frequency, preferably high relative to that of the motor power supply. The detector, which also may be of a conventional type and the oscillator are both coupled to one of the power lines of the motor by respective toroid cores through which the power line passes intermediate the tuned circuits. When the switch is in one state the tuned circuits will resonate enabling the detector to detect the signal and to give an output thereby effecting indication of a fault condition or deenergization of the motor. When the switch is in its opposite state the tuned circuits will not resonate, and there will be no output signal given by the detector.

13 Claims, 5 Drawing Figures

MOTOR PROTECTOR CIRCUIT

This invention relates generally to the protection of dynamoelectric machines and, more particularly, to a motor protection circuit.

The protection of dynamoelectric machines, including motors, from various fault conditions is well known. Typically a motor protector, in the form of a thermistor or bimetallic device, is placed in thermal communication with a winding of the motor to be protected and either conducts motor current or is connected, via conventional leads, to some type of controller. If the protector conducts the motor or line current and is thus adapted to directly interrupt energization of the motor upon the occurrence of a fault condition the protector must be chosen for its current carrying capacity and thus its ability to function as a thermal sensor is necessarily limited. From an operational standpoint optimum protection is afforded when the thermal response to the environment in which the protector is located, i.e. the motor windings, is the factor by which selection is made and not the current carrying capacity of the protector. Further devices, having different current ratings have to be provided for different size motors when the protectors are used to carry motor current. From an economic standpoint and to facilitate inventory maintenance, it obviously is desirable to minimize the number of different ratings which must be provided. This can effectively be done if the protector is designed not to carry line current but rather a specified control current which can be provided with any size motor. In this approach the protector functions as a thermal sensor effecting the control signal upon the occurrence of a fault condition which in turn can deenergize the motor through a control device such as a motor controller. However, this approach necessitates the use of lead lines from the sensor, which is mounted in thermal communication with the motor windings, and the controller which may be physically removed from the motor by a significant distance. In modern industrial environments this distance may be up to a thousand feet or more.

It is therefore an object of the invention to provide means for protecting a motor which minimizes the amount of wiring required for operation as well as optimizes the thermal response of the protector. It is also an object of the invention to provide an inexpensive, reliable motor protective apparatus compatible with existing systems and one which can be used to readily provide multiphase protection and multitemperature indicator functions.

These and other objects are achieved in the present invention by a condition indication circuit which indicates the existence of particular overtemperature conditions existing in a dynamoelectric machine. The circuit includes first and second tuned branch circuits connected across a pair of power supply lines leading to the machine to be protected, for example a motor. An oscillator circuit is coupled to one of the power lines intermediate the first and second tuned circuits for impressing therein a signal having a selected frequency. A detector circuit is also coupled to one of the power lines intermediate the first and second tuned circuits for detecting this signal. A conventional power supply is used to energize the oscillator and detector circuits. The tuned circuits may comprise a serially connected inductance and capacitance and one of the tuned circuits includes a thermally responsive switch adapted to be mounted in thermal communication with a winding of the motor. This switch may be an electro-mechanical device such as a bimetallic switch, or a solid state PTC or NTC thermistor. The tuned circuit incorporating the switch may be conveniently included in the motor terminal box. During normal operation the temperature of the motor is below a preselected level and the thermally responsive switch is in a first state causing an impedance level in the tuned circuit in which it is connected which precludes resonance; however, upon the occurrence in the motor of a fault condition which causes the temperature of the motor winding to increase above the preselected level, the heat is conducted to the thermally responsive switch causing it to change to a second state causing an impedance level in the tuned circuit in which it is connected which causes resonance. When resonance occurs the detector produces an output signal which may be used to deenergize the motor through a conventional controller or to provide an alarm indication as by energizing an alarm light.

Multiphase or multitemperature protection can be provided by employing additional oscillators for impressing signals having frequencies different from the first mentioned signal. Separate detectors and tuned circuits would also be required for each additional frequency utilized.

Figure 1:
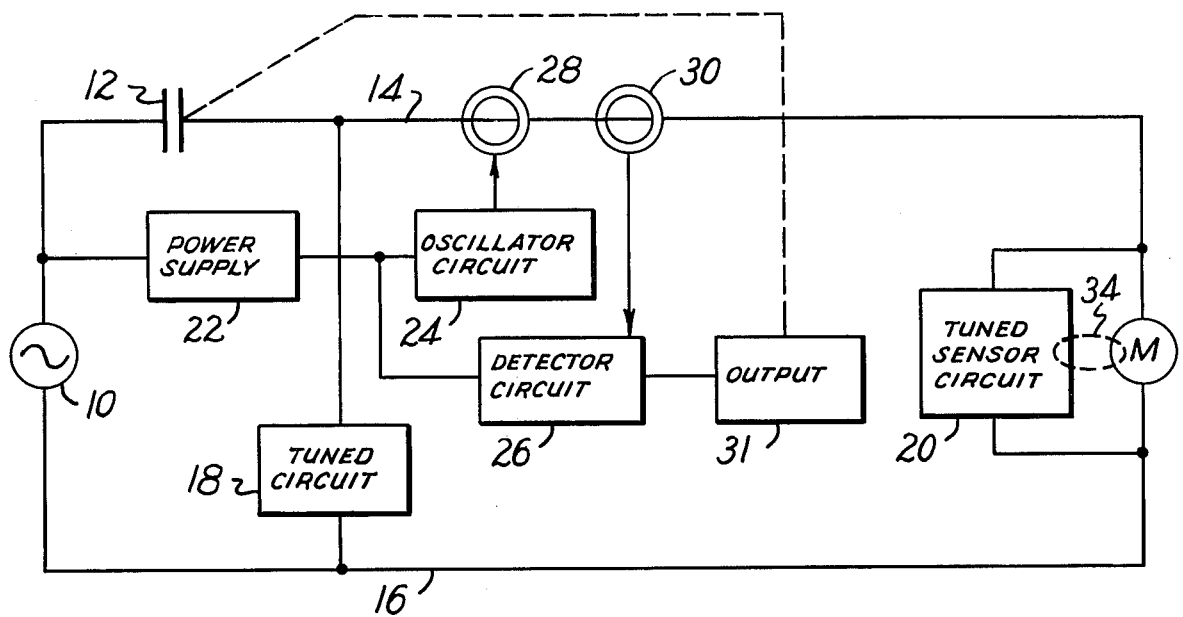
FIG. 1 is a schematic diagram of one embodiment of a motor protection circuit constructed according to the invention.

Referring now to the drawings, specifically FIG. 1, there is shown a motor protection circuit including an alternating current power supply 10, e.g. 240 volts, coupled through contactor 12 by power lines 14 and 16 to a motor M. A first tuned or reactive circuit 18 is connected across lines 14 and 16. Intermediate tuned circuit 18 and motor M a second tuned or reactive circuit 20 is connected across lines 14 and 16. A power supply 22 is connected to line 12 and provides a suitable low voltage supply, e.g. 24 volts, for a conventional oscillator circuit 24 and detector circuit 26. Oscillator circuit 24 is coupled to line 14 in a conventional manner as by inductively coupling through toroidal core 28 and in like manner detector circuit 26 is coupled to line 14 as by inductively coupling through toroidal core 30. Detector circuit 26 is provided with output means 31 which may be coupled to contactor 12 arranged to open the contactor upon occurrence of an output signal or to energize an alarm light (not shown) or other indicating means.

Figure 2:
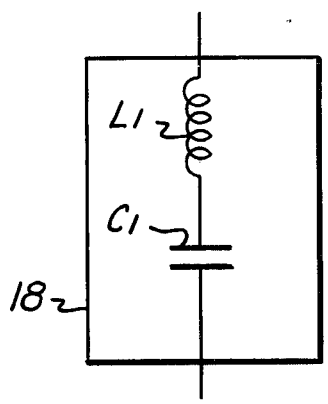
FIG. 2 is a schematic diagram showing the components of a tuned circuit employed in the FIG. 1 embodiment.
Figure 3:
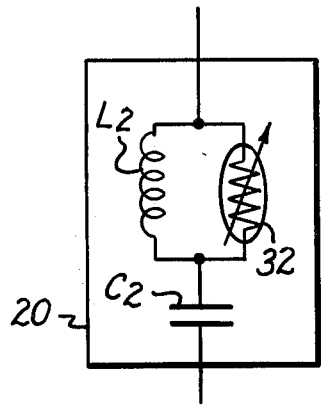
FIG. 3 is a schematic diagram showing the components of one form of a tuned sensing circuit employed in the FIG. 1 embodiment.

Tuned circuits 18 and 20 are adapted to resonate at a selected frequency which is produced by oscillator circuit 24. FIG. 2 shows tuned circuit 18 comprising serially connected inductance L1 and capacitance C1. Tuned circuit 20, identified in FIG. 3 of the drawings as a tuned sensor circuit, includes serially connected inductance L2 and capacitance C2 along with PTC thermistor 32 connected across inductance L2. This sensor circuit may be conveniently disposed in the motor terminal box. PTC thermistor 32 is adapted to be thermally coupled to the motor windings as by physically embedding the thermistor in a winding. Dashed line 34 in FIG. 1 schematically indicates the thermal coupling between the motor windings and the PTC thermistor 32. PTC thermistor 32 is preferably composed of material having a steeply sloped positive temperature coefficient of resistivity at temperatures above an anomaly or threshold temperature and a relatively low resistance at temperatures below the anomaly point Such a thermistor may, for example, be composed of barium titanate doped with lanthanum and other rare earths.

By way of example, the AC power supply for motor M may be 60HZ. The oscillator is chosen so that the frequency of its signal is substantially higher than the 60HZ of the power supply, for example, 10KHZ.

During normal operation of motor M the temperature of its windings is relatively low and is below the anomaly point of thermistor 32. The impedance of thermistor 32 is therefore in a low state during normal operation shunting inductance L2 and precluding resonance in L2, C2. Should a fault condition in motor M occur which causes the temperature of the motor to increase and concomitantly cause the temperature of the thermistor 32 to increase above the anomaly point its impedance suddenly goes into a high state and L2, C2 will resonate with L1, C1 and in effect will form a shorted turn therewith.

The signal impressed through core 28 will then be detected through core 30 by detector circuit 26 causing an output which actuates contactor 12 to deenergize motor M.

Figure 4:
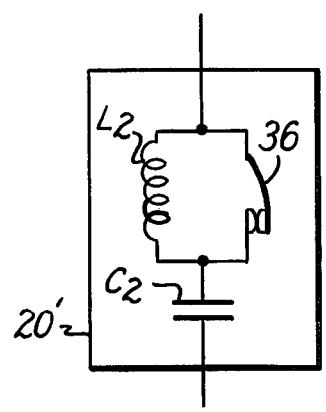
FIG. 4 is a schematic diagram showing the components of a second form of a tuned sensing circuit employed in the FIG. 1 embodiment.

FIG. 4 depicts a modified tuned sensor circuit in which an electro-mechanical thermostatic switch 36 comprising a bimetallic disc is used rather than PTC thermistor 32. Switch 36 is connected across inductance L2 in the same manner as thermistor 32 and also has a low impedance state (closed contacts), and a high impedance state (open contacts). The operation of the circuit is otherwise the same as described above.

If it is desired to provide indication of normal operation PTC thermistor could be substituted by an NTC thermistor. During normal operation the impedance of the thermistor would be high allowing the tuned circuits to resonate. The detector would pick up the resonated signal and provide an output which could be used for example to energize a lamp indicating that the motor was operating under normal conditions. Should the motor overheat the heat will be conducted to the NTC thermistor causing it to go into a low resistance state thereby precluding resonance in the tuned circuit and causing deenergization of the lamp.

Figure 5:
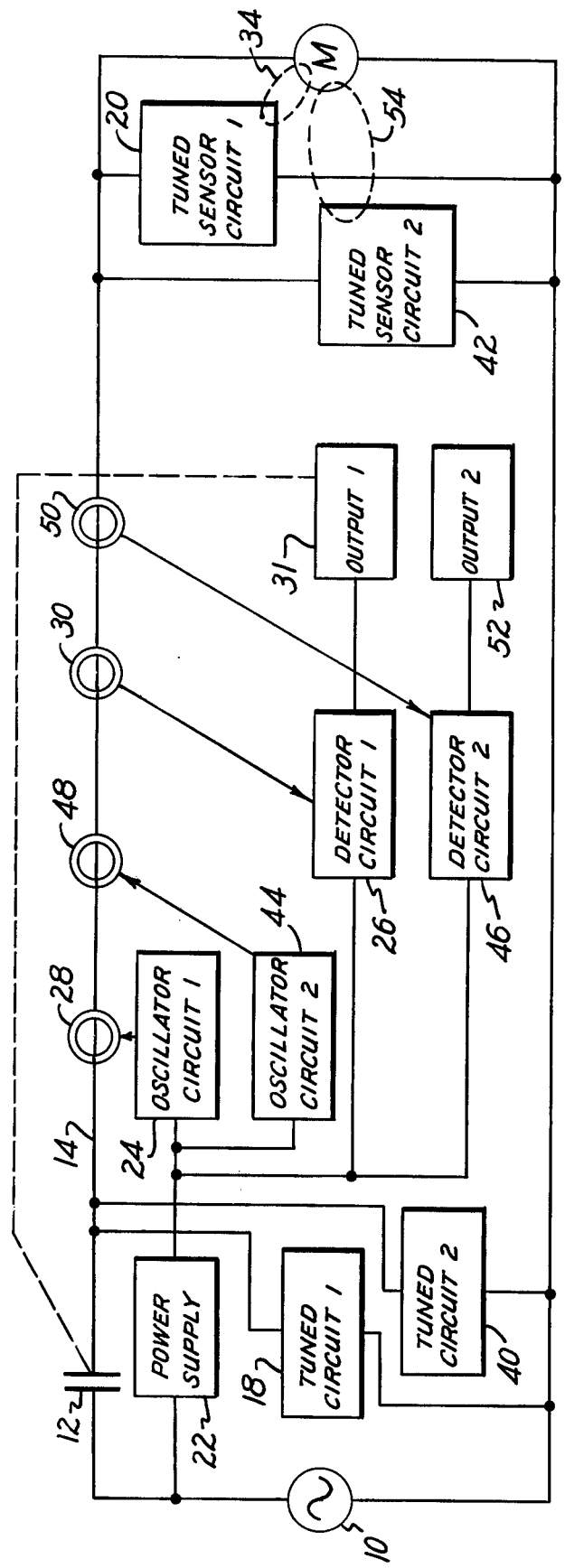
FIG. 5 is a schematic diagram of the motor protection circuit illustrating another embodiment thereof.

FIG. 5 shows the invention employed to provide multicondition indication of a motor. A second tuned system including a second tuned branch circuit 40 and tuned sensor branch circuit 42 connected across lines 14 and 16 are selected to resonate at a second frequency produced by a second oscillator 44 which frequency is different from that produced by oscillator 24. Upon resonance the signal impressed through core 48 will be detected through core 50 by detector circuit 46 which will produce a signal at output 52. It will be understood that tuned circuit 42 includes a thermal switch (PTC thermistor 32 or bimetallic switch 36) thermally coupled (indicated by dashed lines 54) to the motor M. The switches would be selected to change from one state to the other at different temperatures, e.g. T1 and T2. The switches may be placed in heat conductive relationship with the same winding if desired and upon heating of the motor and hence the thermally responsive switches to temperature T1 a signal will be provided at output 52 which can be employed to energize an alarm light or some other indicator means. Upon further heating when the temperature T2 is reached the other thermally responsive switch will change state causing a signal at output 31 which can be employed to actuate contactor 12 to deenergize the motor as in the FIG. 1 embodiment.

Multiphase protection can also be provided by employing switches selected to change from one state to the other at approximately the same temperature and placing them in thermal communication with separate windings. Respective tuned circuit means, oscillators, and detector circuits are then used with power lines leading to the respective windings. Thus should either of the protected windings overheat a contactor can be actuated to deenergize the motor.

While separate cores are shown for the first and second oscillators and the first and second detectors, it may be preferred to use a single core for each and multiplex the signal.

As in the FIG. 1 embodiment NTC thermistors could also be used as the thermally responsive switch to reverse the operation of the tuned sensor circuit so that during normal operation of the motor the tuned circuits are in resonance producing an output signal at the detector and upon overtemperature condition resonance is precluded due to the decrease in the impedance of the NTC thermistor causing no output to be produced at the detector.

Among the advantages the above invention provides is that should a plurality of branch protection circuits be employed there is no interference between different tuned systems. Thus the invention may be employed to protect several motors on the same line by using different frequencies. As noted above use of the power lines of the motor to communicate between the switches and the detector eliminates the need for direct wiring between the switch and the detector thus saves significant material and expense in many instances and makes the system relatively independent of lead length.

It will be noted that a single tuned branch circuit could be used if desired since a closed loop circuit could be effected using the power supply transformer; however, with such a system only one protection circuit could be employed since the transformer acts as a tuned circuit and would be adapted to resonate at only one particular frequency.

In the foregoing specification, the invention has been described with reference to specific exemplary embodiments thereof. However, it will be evident that various modifications and changes may be made thereunto without departing from the broader spirit and scope of the invention as set forth in the appended claims. The specification and drawings are, accordingly, to be regarded in an illustrative rather than in a restrictive sense.

What is claimed:

1. A circuit for detecting overtemperature conditions in a load, comprising:
   first and second AC power supply lines for energizing a load, tuned circuit means connected across the first and second power lines, oscillator circuit means for impressing a signal having a selected frequency in said tuned circuit means, detector circuit means for detecting said signal, power supply means coupled to said oscillator circuit means and detector circuit means, thermally responsive switch means having first and second states electrically coupled to the tuned circuit means so that in one state the impedance of the tuned circuit means is at a level precluding resonance therein while in the other state the impedance of the tuned circuit means is at a level causing resonance therein, the thermally responsive switch adapted to be thermally coupled to the load whereby overtemperature conditions in the load will cause the thermally responsive switch to change from one state to the other, and output means coupled to said detector circuit means providing an output signal when the tuned circuit means is in resonance.

2. A circuit according to claim 1 in which the tuned circuit means includes first and second tuned circuits each including an inductance and a capacitance.

3. A circuit according to claim 1 in which the thermally responsive switch is a bimetal switch connected in parallel with one of the inductance and capacitance is one of the tuned circuits.

4. A circuit according to claim 1 in which the thermally responsive switch is a PTC thermistor connected in parallel with one of the inductance and capacitance in one of the tuned circuits.

5. A circuit according to claim 2 in which the thermally responsive switch is a bimetal switch connected in parallel with one of the inductance and capacitance in one of the tuned circuits.

6. A circuit according to claim 2 in which the thermally responsive switch is a PTC thermistor connected in parallel with one of the inductance and capacitance in one of the tuned circuits.

7. A circuit according to claim 2 in which the thermally responsive switch is an NTC thermistor connected in parallel with one of the inductance and capacitance in one of the tuned circuits.

8. A circuit according to claim 2 further including a second tuned circuit means connected across the first and second power lines, a second oscillator circuit means including third and forth tuned circuits for imposing a second signal having a selected frequency different from the signal provided by the first oscillator means, a second detector circuit means for detecting said second signal, power supply means coupled to said second oscillator circuit means and second detector circuit means, and a second thermally responsive means having first and second states electrically coupled to the second tuned circuit means so that in one state the impedance of the tuned circuit means is at a level precluding resonance therein while in the other state the impedance of the second tuned circuit means is at a level causing resonance therein, the second thermally responsive switch adapted to be thermally coupled to the load whereby overtemperature conditions in the load will cause the second thermally responsive switch to change from one state to the other, and second output means coupled to said second detector circuit means providing an output signal when the second tuned circuit means is in resonance.

9. A circuit according to claim 8 in which the said thermally responsive switches change from one state to the other upon reaching approximately the same temperatures.

10. A circuit according to claim 8 in which the said second thermally responsive switch changes from one state to the other upon reaching a temperature substantially different than the temperature at which the other thermally responsive switch changes from one state to the other.

11. A circuit according to claim 8 in which the thermally responsive switches are bimetal switches.

12. A circuit according to claim 8 in which the thermally responsive switches are PTC thermistors.

13. A circuit for detecting overtemperature conditions in a motor comprising:

first and second AC power supply lines for energizing a motor, a tuned circuit comprising a series connected inductance and capacitance connected across the first and second power supply lines, a tuned sensing circuit comprising a series connected inductance and capacitance connected across the first and second power supply lines intermediate the motor and the tuned circuit, oscillator circuit means coupled to one of the power lines for impressing a signal at a selected frequency in said one line, detector circuit means coupled to one of the power supply lines for detecting said signal, the oscillator circuit means and the detector circuit means disposed intermediate the tuned circuit and the tuned sensing circuit, power supply means coupled to the oscillator circuit means and the detector circuit means, a thermally responsive switch coupled to the tuned sensing circuit to change the effective impedance of the tuned sensing circuit from a level precluding resonance in the tuned circuits at temperatures below a preselected level to a level causing resonance in the tuned circuits at temperatures above the preselected level, and output means coupled to said detector circuit means providing an output signal when the tuned circuits are in resonance.

* * * * *